United States Patent Office 3,099,058
Patented July 30, 1963

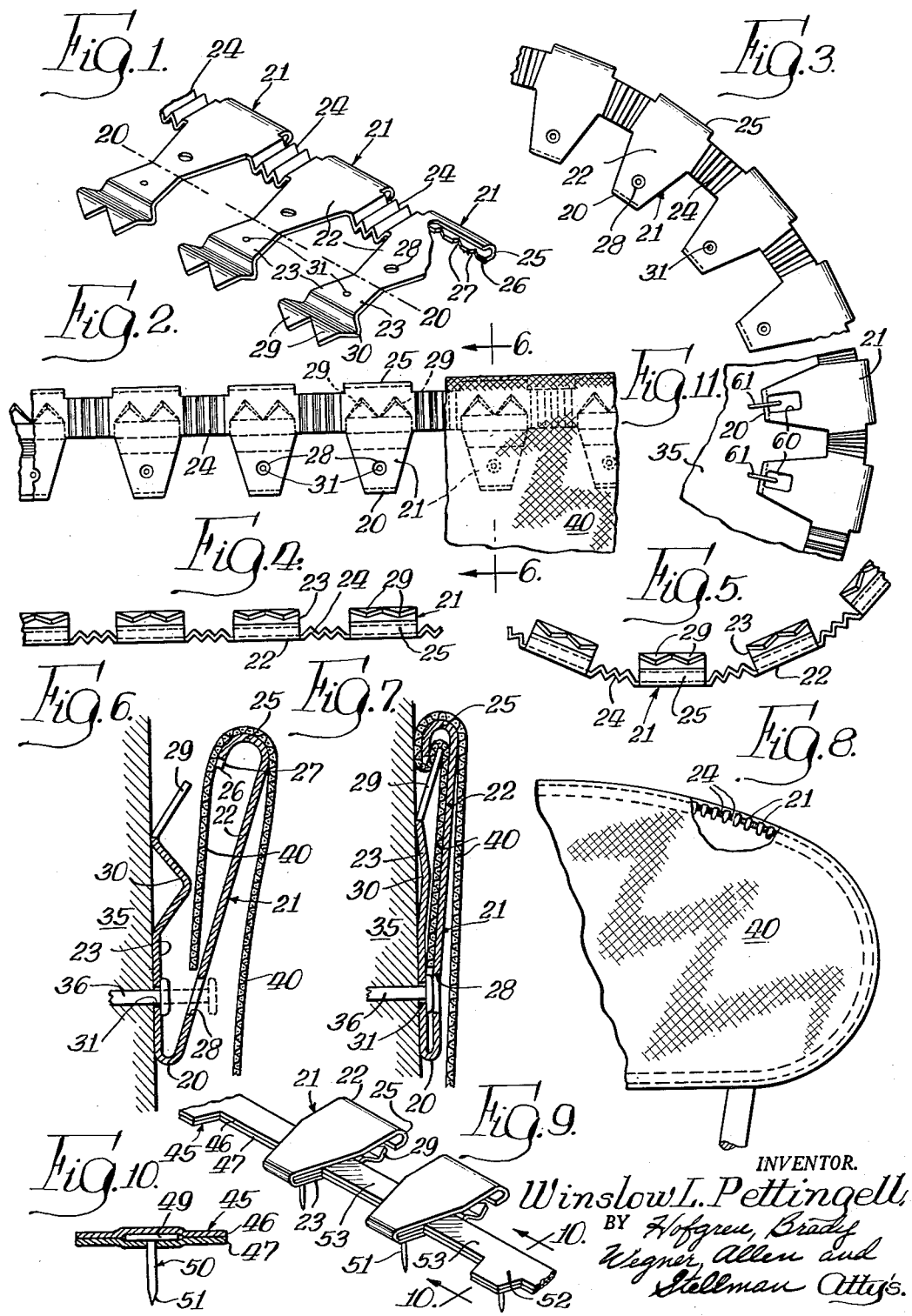

3,099,058
UPHOLSTERY TACKING STRIP
Winslow L. Pettingell, Highland Park, Ill. (% McCloskey & Pettingell Associates, 4122 W. Peterson Ave., Chicago 46, Ill.)
Filed Oct. 20, 1960, Ser. No. 63,926
7 Claims. (Cl. 24—152)

This invention relates to a fastening strip for securing fabric such as upholstery material to furniture or other surfaces to be covered.

An object of this invention is to provide an upholstery fastening strip that can be bent to conform to sharp radii and contours on surfaces to be upholstered, in different planes, without bulk at the fastening area.

Another object is to provide an upholstery fastening strip for securing fabric to a surface that will be completely concealed by the fabric and not require any edge trim or binding and which can be readily and easily severed at any point along its length.

Another object is to provide such a fastening strip, having a series of U-shaped clips flexibly joined by an accordion-like pleated portion that is readily and easily bent in various directions to allow the clips to conform to sharp curvatures in different planes.

Another object is to provide such a flexible fastening strip, having a series of U-shaped clips, one of the legs of the U having prongs on its end that will engage and wedge the fabric into a channel portion formed on the end of the other leg of the clip.

Another object is to provide holes in the legs of the clip for fastening the clip to the surface to be upholstered, and having the hole in the outside leg of a larger diameter than the head of the fastening nail so that the head will pass through the hole and not add to the bulk of the fastener. Another object is to provide a flexible upholstery retaining strip that can be formed from a single strip of thin soft metal, which can be easily and inexpensively made, and another object is to provide such a strip that can be applied quickly to the surface to be upholstered and requires no special tools for attachment.

Still another feature is the provision of such a strip having a series of U-shaped clips whereby one of the legs of the clip is provided with prongs at the end thereof and pleated on its surface to shorten its length so that when the fabric is placed between the legs of the clip and the clip pounded flat, the pleats straighten, extending the length of the leg and the sprongs will pierce the fabric and wedge it into a channel formed in the other leg of the clip.

Further objects and advantages of the invention will be readily apparent from the following detailed description taken in connection with the accompanying drawings in which:

FIG. 1 is a partially cut away perspective view of a portion of the fastening strip prior to folding the clip into a U-configuration;

FIG. 2 is partially cut away plan view of the fastening strip;

FIG. 3 is a plan view showing the strip bent around a radius;

FIG. 4 is a top view of a portion of the strip;

FIG. 5 is a top view of a portion of the strip bent around a radius that is in a different plane than the radius shown in FIG. 3;

FIG. 6 is an enlarged cross sectional side view of a clip that is open to receive the upholstery fabric taken substantially along line 6—6 of FIG. 2;

FIG. 7 is similar to FIG. 6 except that the clip has been forced closed to secure the upholstery fabric;

FIG. 8 shows the application of the strip to a piece of furniture;

FIG. 9 is a perspective view of a modified form of the fastening strip;

FIG. 10 is an enlarged sectional view taken substantially along line 10—10 of FIG. 9; and FIG. 11 is a modified form of the fastening strip.

Referring to the drawings, an embodiment of the fastening strip is shown in FIG. 1 prior to folding along line 20—20 and is produced from a single thin soft metal strip such as aluminum. A series of flat clips 21 are formed into a general U-shaped configuration having legs 22 and 23 which can more readily be seen in the cross sectional side views of FIGS. 6 and 7.

The clips are joined by accordion-like pleated portions 24, having the pleats in a direction at right angles to the length of the strip. The pleated portions are sufficiently flexible to allow relative movement between the clips 21, and enable the strip to be formed about sharp radii and curvatures of a piece of furniture or other article to be covered with upholstery, in different planes. The legs 22 and 23 of the clip 21 are wider at their end portions than at their point of juncture 20 in order to provide a greater relative movement between the clips. The end portion of the leg 22 is formed into a channel 25 that opens downward, extends towards the leg 23 and has a leading edge 26 provided with a plurality of notches 27. A hole 28 is provided through the surface of the leg 22 adjacent the foldable juncture 20. The upper edge portions of the leg 22 adjacent the channel 25 extend outwardly and form the accordion-like pleated sections 24 that connects the clips 21. The leg 23 of the clip 21 has its end provided with sharp prongs 29, which are bent toward the leg 22, and a bend or pleat 30 is provided in the surface of the leg 23 traverse its length to effectively shorten the length in such a manner that the tip of the prongs 29 will clear the edge 26 of channel 25 as the legs of the clip are forced together. A hole 31 is provided in the surface of leg 23 adjacent the juncture 20, in line with the hole 28 and of a smaller diameter than the hole 28.

The method of attaching the fastening strip to a surface and of securing an upholstery fabric thereto will now be described. Referring to FIG. 6 a cross section of a clip 21 is shown as being attached to a surface 35. The leg 23 is placed against the surface and a tack 36 is inserted through the holes 28 and 31 and forced into the surface 35. The hole 28 is sufficiently large so that the head of the tack passes through and securely holds the leg 23 against the surface 35. This fastening process is followed for each clip in the strip as the strip is bent around sharp radii and contours of the surface to be covered. It is to be understood that any type of fastener may be employed to secure the strip to the surface such as nails, screws or machine staples. The leg 22 of the clip 21 is bent away from the leg 23 as shown in FIG. 6 to provide sufficient opening between the two legs so that upholstery material 40 may be drawn over the outside surface of the leg 22 and down between the legs of the clip 21. The same procedure is followed for all of the clips and the clips are pounded with a rubber mallet or other suitable tool forcing the leg 22 against the leg 23. The prongs 29 engage the upholstery material 40 and form it around the edge 26 and continued forcing of the leg 22 straightens out the bent prongs 29 and the pleat 30 extending the length of the leg 23 and forcing the fabric up into the channel 25 as shown in FIG. 7. The prongs 29 will also pierce the fabric 40 as it wedges in the channel 25 and hold it tightly against the notches 27 of the edge 26 to securely fasten the fabric within the clip. In the finished assembly the leg 22 lies flat against the straightened leg 23 and the channel 25 is closed upon the prongs 29. The strip thus affords a minimum of bulk at the fastening area and the fabric is retained in a stretched condition over the surface to be covered. As shown in FIG. 6 the space between the legs 22 and 23 afford sufficient room for any excess of material, and it is apparent that variances in length of the fabric will not affect the fastening action of the clip; therefore, using this type of fastening clip will, in a sense, correct any previous errors in the cutting of the fabric.

FIG. 8 shows a portion of the strip as it appears on the back of a chair or other type of furniture and it can be seen that the strip may be easily formed about the entire curvature of the chair without adding bulk at the point of fastening.

FIGS. 9 and 10 show a modified form of the fastening strip whereby the clip portions 21 are identical, except for the holes 28, with the clips of the first described fastening strip. In its modified form the strip has the clips 21 joined by a cardboard strip 45 having layers 46 and 47 lying atop one another and having the head 49 of a tack 50 embedded between the layers with the point 51 of the tack extending through the layer 47 as shown in FIG. 10. The tacks are secured to the cardboard strip in the above described manner at spaced intervals along the length thereof and the portion of the cardboard strip 52 that surrounds the tacks is sized to conform with the shape of the lower portion of the clip 21. The cardboard strip 45 is placed between the legs 22 and 23 of the clips with the points 51 of the tacks extending through the holes 31 thereby connecting the clips to the strip. The portion of the strip 45 intermediate the portions 52 is a relatively narrow portion 53 which forms the flexible connection between the clips 21 and which enables the clips to be bent around sharp radii and curvatures of the surface to be covered in different planes. A modified form of the fastening strip that enables rapid economical fastening of the strip to a surface by means of machine staples is shown in FIG. 11. A slot 60 is provided in the leg 21, adjacent the juncture 20. The slot acts as a guide for the tip of a stapling gun (not shown). One half of a staple 61 passes through the slot 60 penetrating the leg 23 and the surface 35 while the other half of the staple is driven directly into the surface thereby securing the strip to the surface as shown in FIG. 11.

While I have shown and described certain embodiments of my invention, it is to be understood that it is capable of many modifications. Changes therefore in the construction and arrangement may be made without departing from the spirit and scope of the invention as disclosed in the appended claims.

I claim:

1. A fastening strip for securing upholstery fabric to a surface formed from a single strip of material and adaptable to curvatures in different planes of said surface, comprising: a series of flat clips having a generally U-shaped configuration, one leg of said U provided with at least one prong at the end thereof and the other leg of said U having a channel portion formed by the end thereof extending toward said one leg and open toward said prong, said clips being flexibly joined at the edges of said other leg by an accordion-like pleated portion, having the pleats transverse to the length of the strip whereby said pleated portion is readily flexible and allows said clips to move relative to each other and be formed about sharp radii and curvatures of said surface in different planes; means for fastening said strip to said surface; and means for securing said fabric between said legs and within said channel.

2. A fastening strip for securing fabric to a surface and adaptable to curvatures in different planes of said surface comprising: a series of flat clips having a generally U-shaped configuration, one leg of said U provided with one prong at the end thereof and the other leg of said U having a channel portion formed by the end thereof, both of said legs having their surface provided with in-line holes adjacent the juncture of said legs, the hole in said other leg being of a larger diameter than the hole in said one leg; a flexible connection at the edges of said other leg joining said clips; means to fasten said strip to the surface with said one leg adjacent the surface, including a fastener having a head thereon, inserted through said holes, whereby the head of said fastener passes through the large diameter hole and fastens said one leg to the surface; and means for securing said fabric between the legs of said clips and within said channel.

3. A fastening strip for securing fabric to a surface and adaptable to curvatures in different planes of said surface comprising: a series of flat clips having a generally U-shaped configuration, one leg of said U provided at the end thereof with a plurality of prongs bent toward another leg of said U, said one leg having pleats formed in the surface and at right angles to the length thereof whereby the length of said one leg is shortened, the other leg of said U having a channel formed by the end thereof, said channel extending toward said one leg and open toward said prongs, said clips being flexibly joined at the edges of said other leg by an accordion-like pleated portion that allows said clips to move relative to each other and be formed about sharp radii; means to fasten said strip to the surfaces with said one leg adjacent the surface; and means for securing said fabric between said legs and within said channel.

4. A flexible upholstery retaining strip formed from a single strip of thin soft metal and adaptable about sharp radii and curvatures in different planes of the surface to be covered comprising: a series of flat clips of a generally U-shaped configuration, one leg of said U provided with a plurality of prongs at the end thereof and having pleats formed in the surface and at right angles to the length thereof, shortening said length, the other leg of said U having a channel formed by the end thereof extending toward said one leg and open toward said prongs, said clips being flexibly joined at the edges of said other leg adjacent said channel; means for fastening the strip to the surface with said one leg adjacent said surface and the channel portion of said clips extending towards said surface; means to bring the edge of the upholstery material over the outer surface of said other leg and down between said legs; and means for forcing the legs of said U clip together thereby straightening out the pleats in said one leg and extending the length thereof, whereby said prongs will pierce the upholstery material and force it into the channel substantially securing it to said surface.

5. A flexible upholstery retaining strip formed from a single strip of thin soft metal and adaptable about sharp radii and curvatures in different planes of a surface to be covered comprising: a series of flat clips of generally U-shaped configuration, the legs of said U being wider at the ends thereof than at the juncture of said legs, one of said legs being provided with at least one prong at the end and having pleats formed in the surface and at right angles to the length thereof, thereby shortening the length, and having a hole provided the surface thereof adjacent the juncture of said legs, the other leg of said U having a channel formed by the end thereof extending toward said one leg and open toward said prong, and having the surface thereof provided with a fastening hole in line with the hole in said other leg and of a larger diameter, said clips being flexibly joined at the edges of said other leg adjacent the channel by an accordion-like pleated portion having pleats in a direction normal to the length of said strip, said pleats being deformable to allow the clips to be moved relative to each other; means to fasten said strip to the surface with said one leg adjacent the surface and said channel extending toward said surface, including a fastener having a head thereon whereby the head of said fastener passes through said large diameter hole and secures said one leg to the surface; means to bring the edge of upholstery material over the outer surface of said other leg and between said legs; and means for forcing the legs of said clip together to straighten out the pleats in said one leg and extend the length thereof, whereby said prongs force said material into the channel, piercing said material and substantially securing it to the surface.

6. A tacking strip for attaching a sheet of fabric to a frame along a peripheral curve in the plane of the fabric adjacent the curve, comprising: a flexible body readily deformable for conforming to the peripheral curve and the adjacent plane of the fabric, similarly oriented U-shaped clips spaced laterally of said body and having opposed legs with free ends, means for securing said body to the frame with said U-shaped clips opening outwardly of the frame and said leg free ends along the peripheral curve, each of said clips having means initially positioned for receiving the fabric after the body has been secured to the frame and movable to a fastening position for fastening the fabric to the frame and retaining the fabric at least as taut as in initial position, the last said means comprising at least one pointed prong on one of said leg free ends and a channel on the free end of other leg, said channel extending from said other leg generally toward said one leg and adapted to receive said fabric about its outer surface with the edge of the fabric between the legs in initial position, and receiving said one leg free end therein in fastening position to impale the fabric on said prong, said leg free ends being spaced apart a substantial distance in initial position and being closely disposed in fastening position, and means defined by pleats in said one leg and transverse to the length thereof and extending toward the other leg to be flattened by said other leg as the other leg is displaced toward fastening position for displacing said free end of said one leg outwardly toward said channel and said prong into engagement with the fabric to seat the fabric in said channel with the fabric impaled on said prong.

7. A clip for holding fabric, comprising: opposed legs having adjacent free ends, fabric gripping means on one of said leg free ends and a channel on the free end of other leg, said channel extending from said other leg generally toward said one leg and adapted to receive said fabric about its outer surface with an edge of the fabric between the legs in initial position, and said channel receiving said one leg free end therein in fastening position to hold the fabric on said gripping means, said leg free ends being spaced apart a substantial distance in initial position and being closely disposed in fastening position, and means defined by pleats in said one leg transverse to the length thereof and extending toward the other leg in initial position to be flattened by said other leg as the other leg is displaced toward fastening position and displacing said free end of said one leg outwardly toward said channel for moving said gripping means into engagement with the fabric to seat the fabric in said channel with the fabric held on said gripping means.

References Cited in the file of this patent
UNITED STATES PATENTS

| | | |
|---|---|---|
| 377,991 | Connell | Feb. 14, 1888 |
| 1,665,475 | Plym | Apr. 10, 1928 |
| 2,194,709 | LoveJoy | Mar. 26, 1940 |
| 2,234,106 | Bowerman | Mar. 4, 1941 |
| 2,325,500 | Fosberg | July 27, 1943 |
| 2,443,959 | Merrill | June 22, 1948 |
| 2,876,826 | Neely et al. | Mar. 10, 1959 |
| 2,986,793 | Bright | June 6, 1961 |

FOREIGN PATENTS

| | | |
|---|---|---|
| 713,575 | Great Britain | Aug. 11, 1954 |